US012801429B2

United States Patent

Wagner et al.

(10) Patent No.: US 12,801,429 B2
(45) Date of Patent: Nov. 17, 2026

(54) COGNITIVE RESOURCE SCHEDULING

(71) Applicant: The Government of the United States of America, as represented by the Secretary of the Navy, Arlington, VA (US)

(72) Inventors: Kevin Wagner, Washington, DC (US); Paul Rademacher, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 609 days.

(21) Appl. No.: 17/830,321

(22) Filed: Jun. 1, 2022

(65) Prior Publication Data

US 2022/0391249 A1 Dec. 8, 2022

Related U.S. Application Data

(60) Provisional application No. 63/195,571, filed on Jun. 1, 2021.

(51) Int. Cl.
*G06F 9/48* (2006.01)
*G06F 9/50* (2006.01)

(52) U.S. Cl.
CPC .......... *G06F 9/4881* (2013.01); *G06F 9/5038* (2013.01)

(58) Field of Classification Search
CPC ...... G06F 9/4881; G06F 9/5038; G06Q 10/06
See application file for complete search history.

(56) References Cited

U.S. PATENT DOCUMENTS

| | | | | |
|---|---|---|---|---|
| 10,860,372 | B1 * | 12/2020 | Bai | G06F 9/4881 |
| 2013/0219407 | A1 * | 8/2013 | Weinman, Jr. | G06F 9/4843 718/105 |
| 2018/0109574 | A1 * | 4/2018 | Vigoda | G06N 20/00 |

* cited by examiner

*Primary Examiner* — Sisley N Kim
(74) *Attorney, Agent, or Firm* — US Naval Research Laboratory; William P. Ladd

(57) ABSTRACT

Systems and methods are provided for cognitive resource scheduling for radar systems. Embodiments of the present disclosure demonstrate the implementation of a policy neural network to perform task scheduling, which offers superior performance to existing heuristic methods while maintaining feasible execution times to enable real-time implementation.

19 Claims, 13 Drawing Sheets

COGNITIVE RESOURCE SCHEDULING

CROSS REFERENCE TO RELATED APPLICATIONS

This application claims the benefit of U.S. Provisional Patent Application No. 63/195,571, filed on Jun. 1, 2021, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 110965-US4.

FIELD OF THE DISCLOSURE

This disclosure relates to radar systems, including task scheduling for radar systems.

BACKGROUND

Modern phased-array radars are designed to perform multiple functions simultaneously, such as surveillance and tracking. To execute these functions, a radar resource manager (RRM) is used to allocate the required resources to each function; for example the manager determines when to transmit a dwell, the duration of the dwell, in which direction, and at which RF frequency. Including parameter selection, setting task priorities, and task scheduling, RRM is an active area of research.

The RRM is typically split into two components: task-parameter selection and prioritization and; subsequently, task scheduling. The task-scheduling problem is in general an NP-hard problem. Hence, as the number of tasks to be scheduled grows, the time to find the optimal schedule using enumerative techniques like the branch-and-bound (B&B) algorithm grows exponentially. This quickly becomes infeasible when trying to implement a RRM in real time. Heuristic techniques, like the earliest starting time (EST) and earliest deadline (ED) algorithms can support real-time implementation, but result in suboptimal scheduling of tasks. Suboptimal scheduling of tasks leads to delaying or dropping tasks, which can yield poor overall radar-tracking and surveillance performance.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 4:
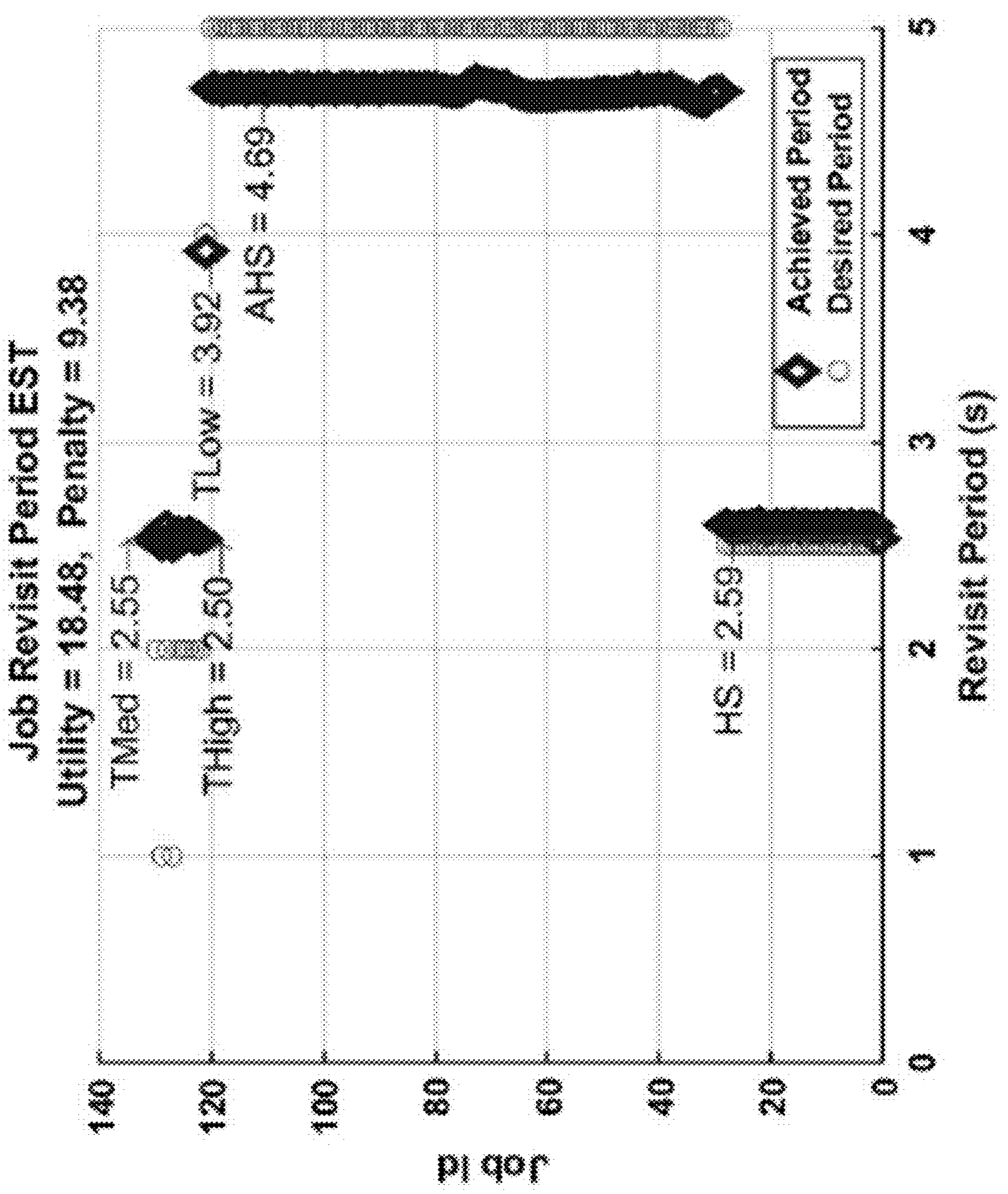
Figure 5:
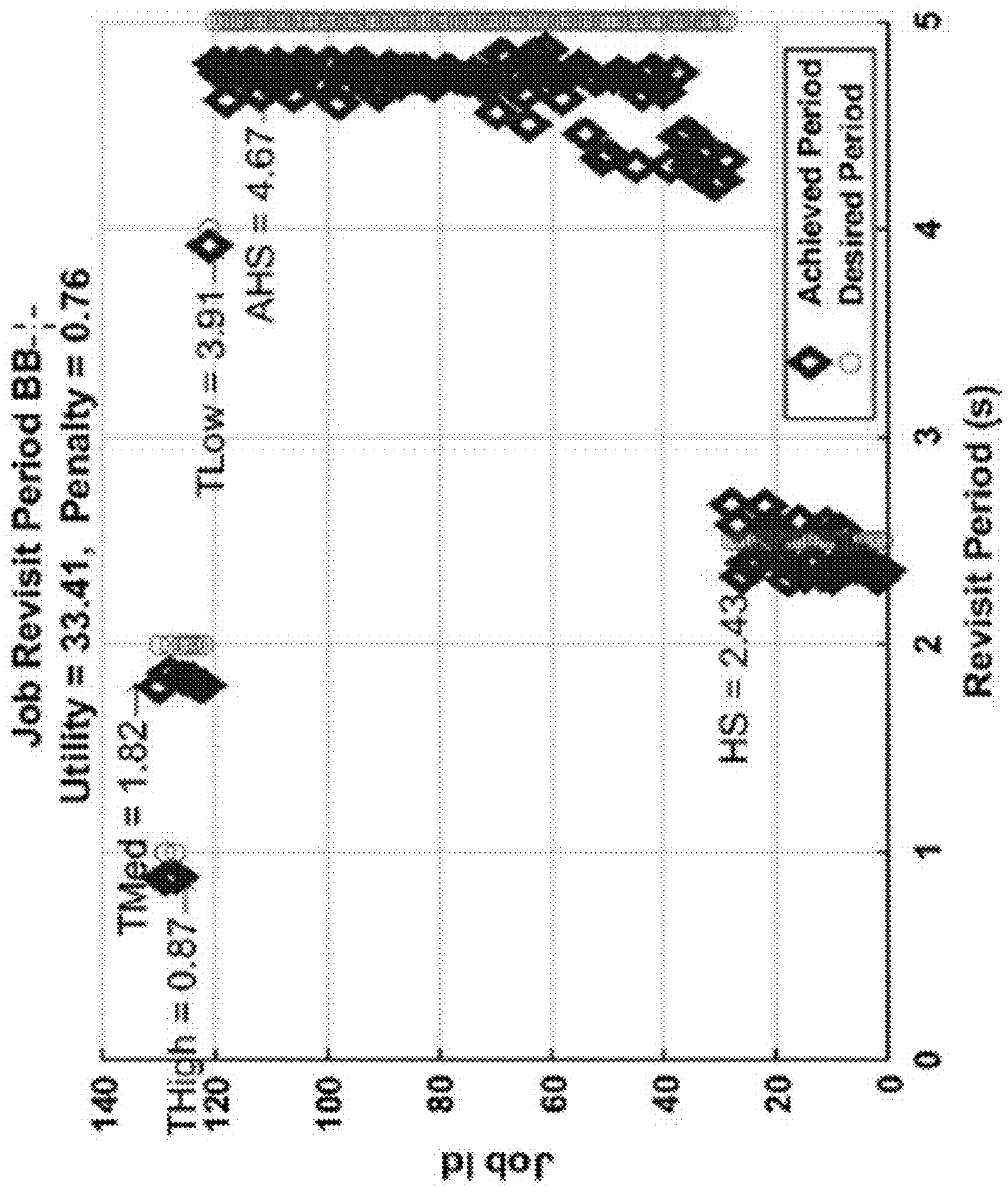
Figure 6:
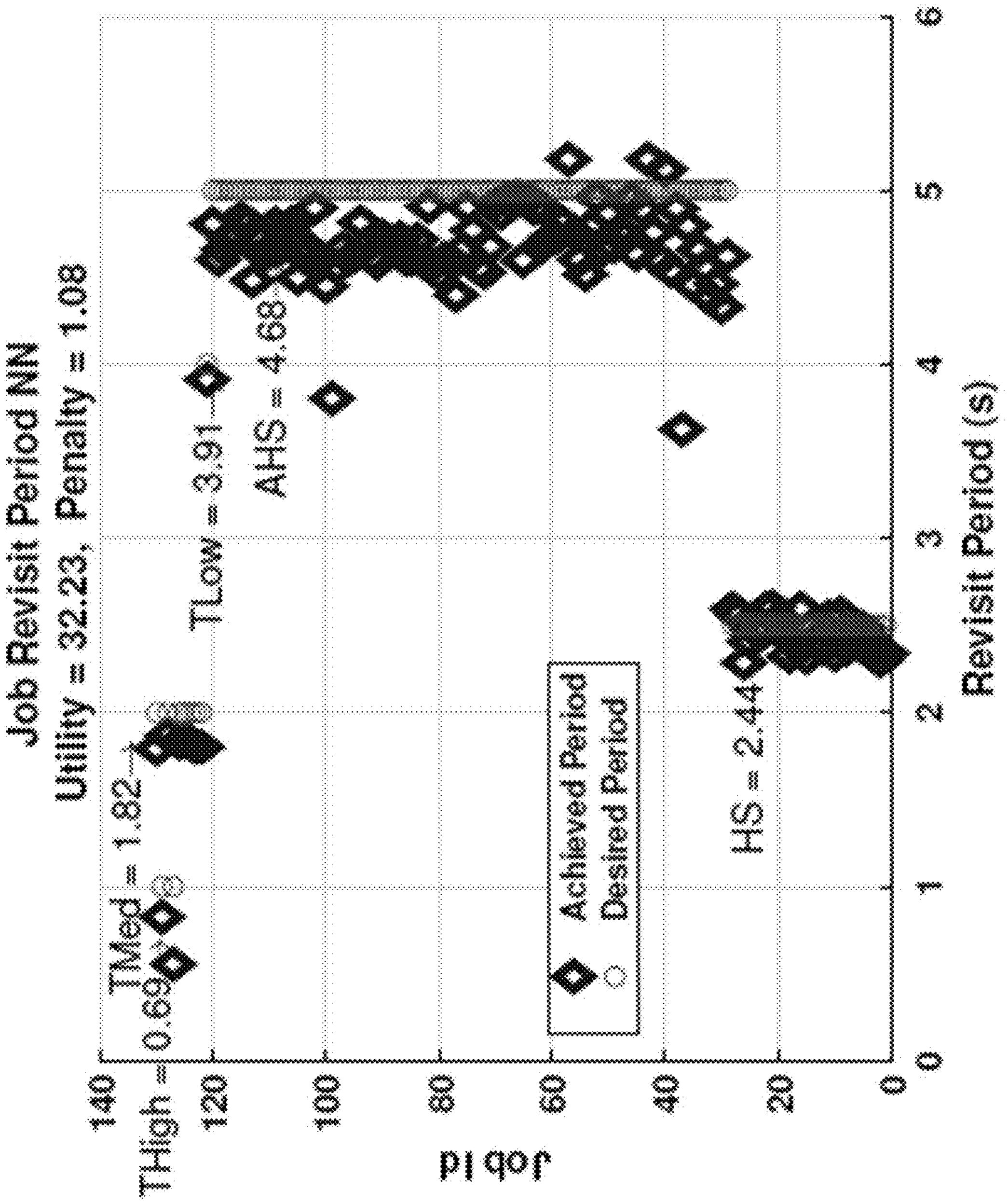
Figure 7:
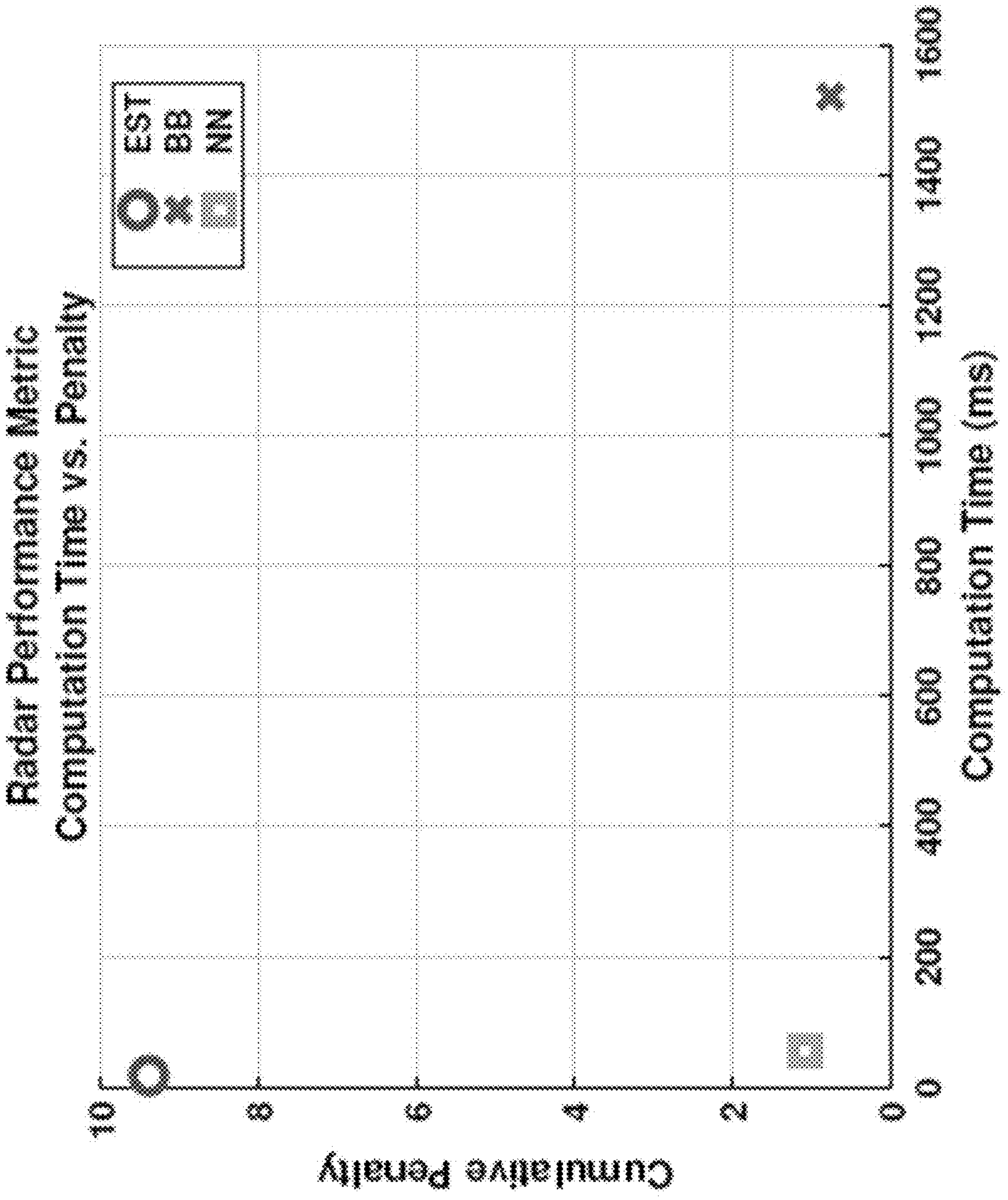
Figure 8:
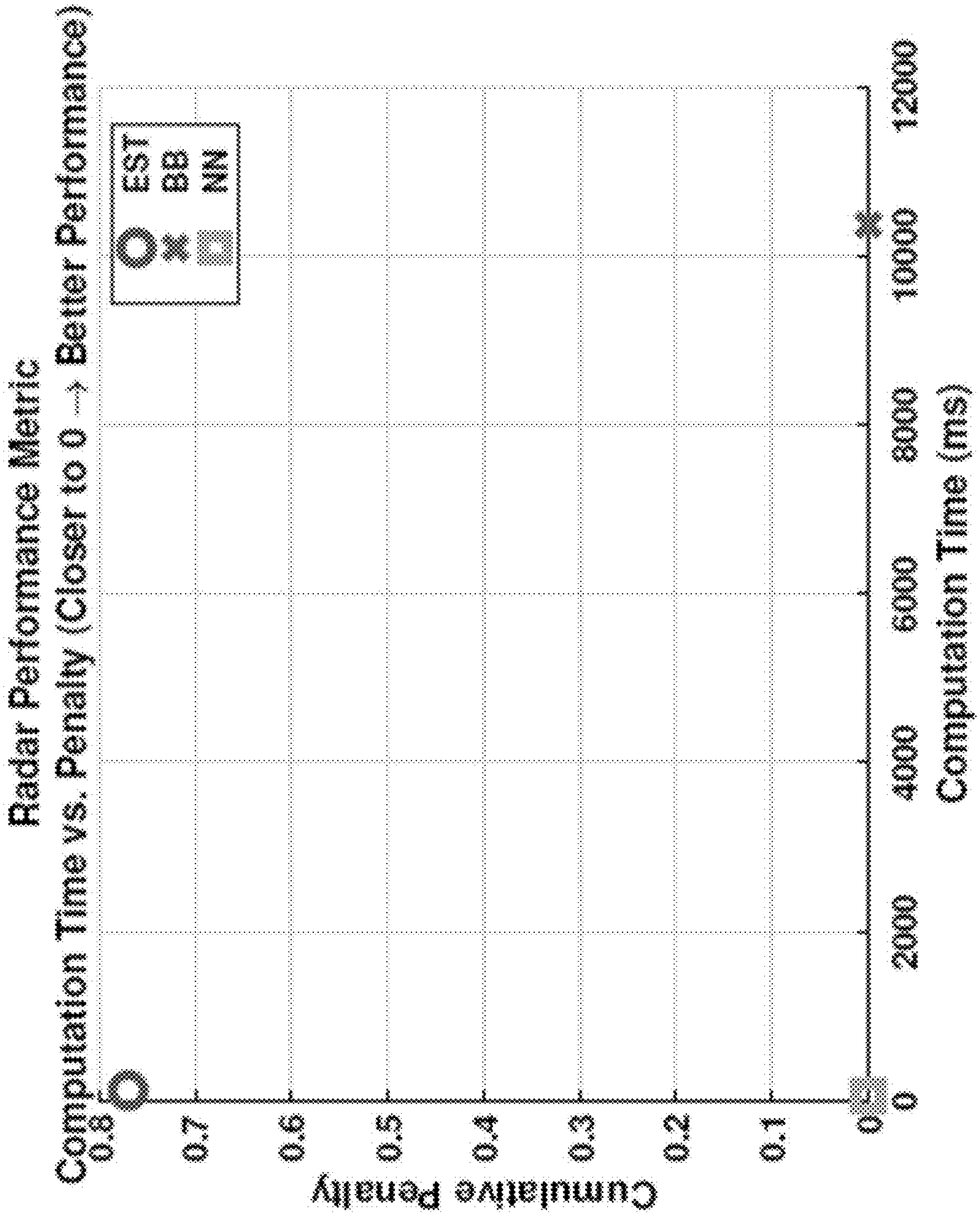
Figure 9:
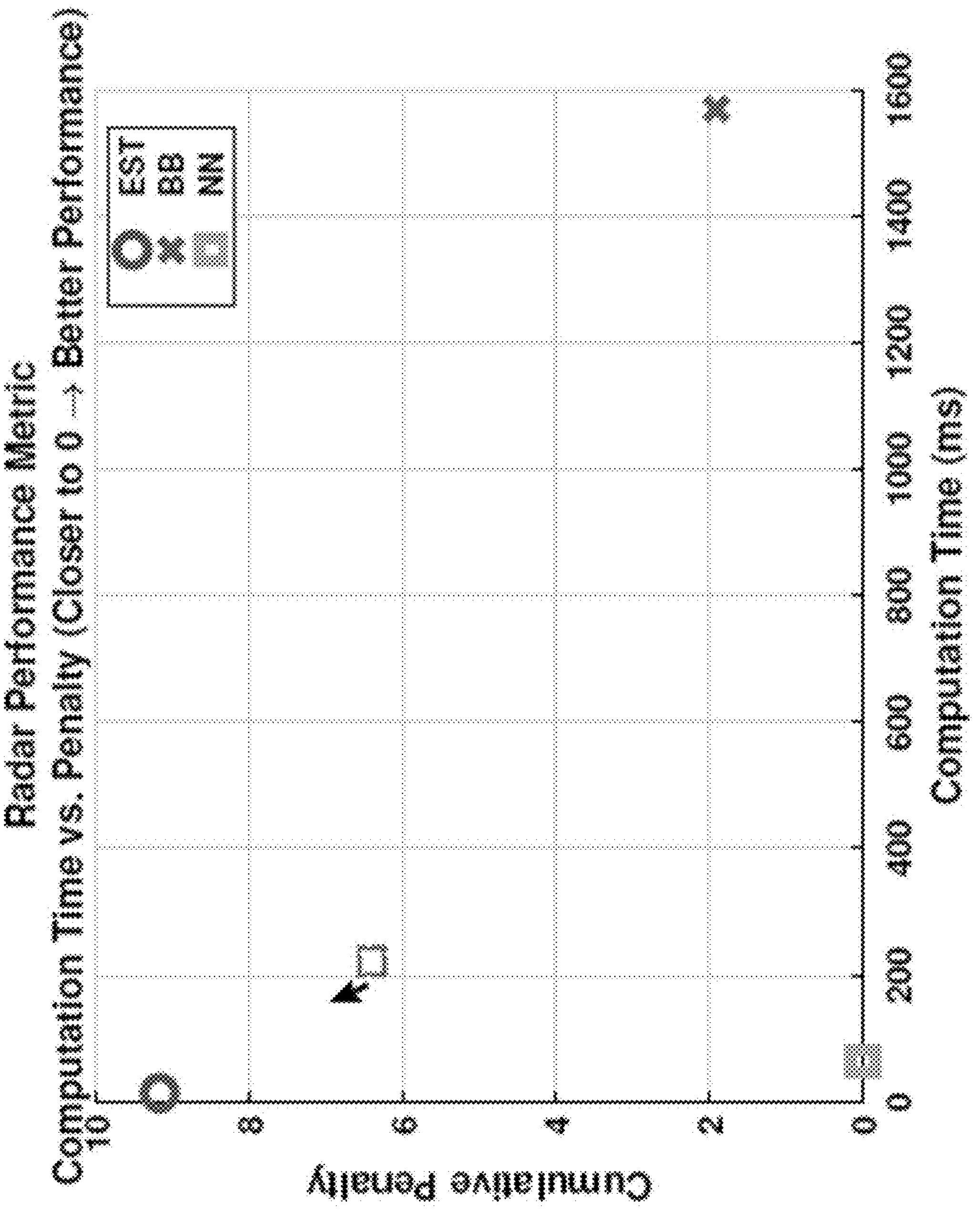
Figure 10:
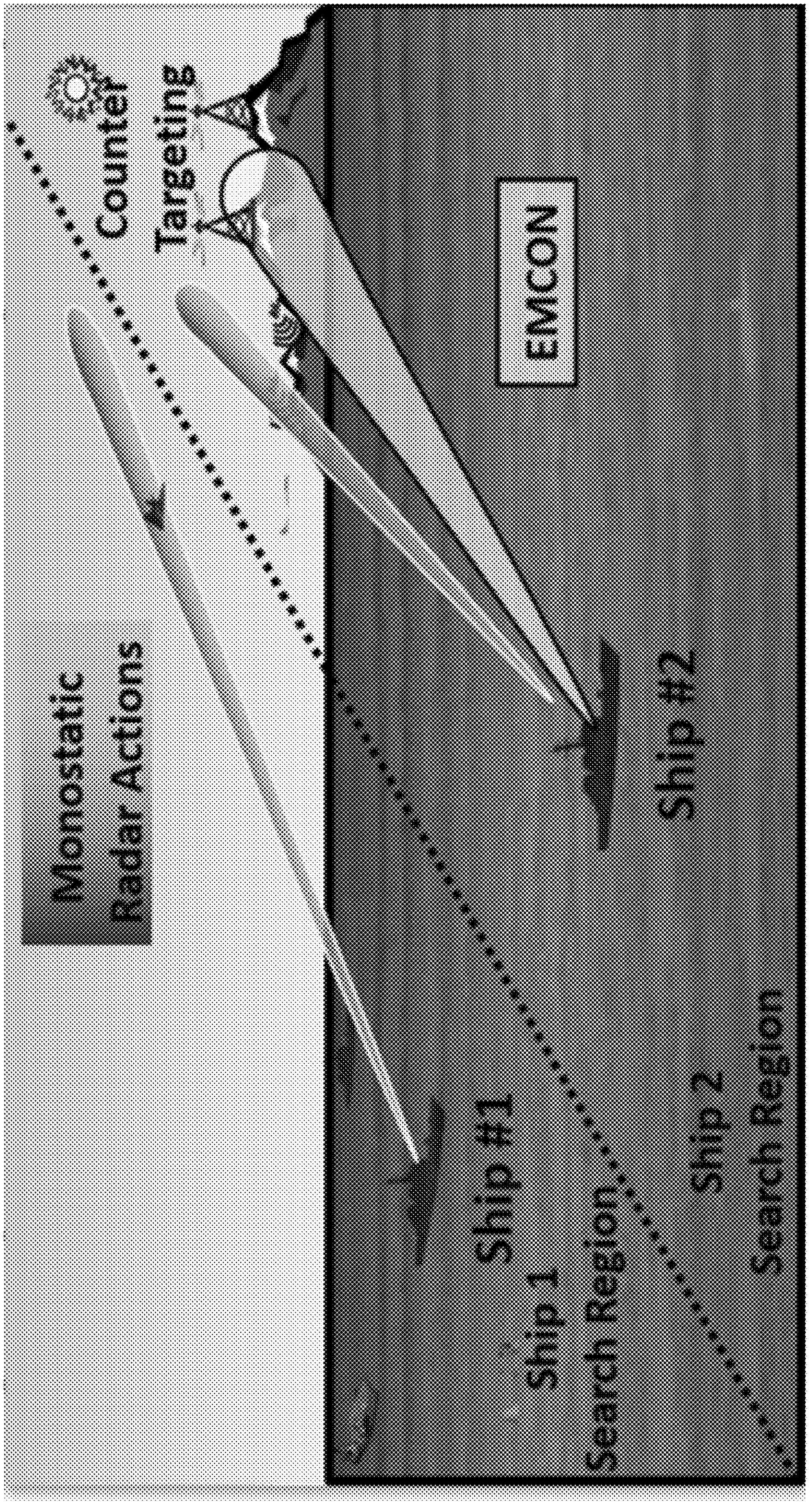
Figure 11:
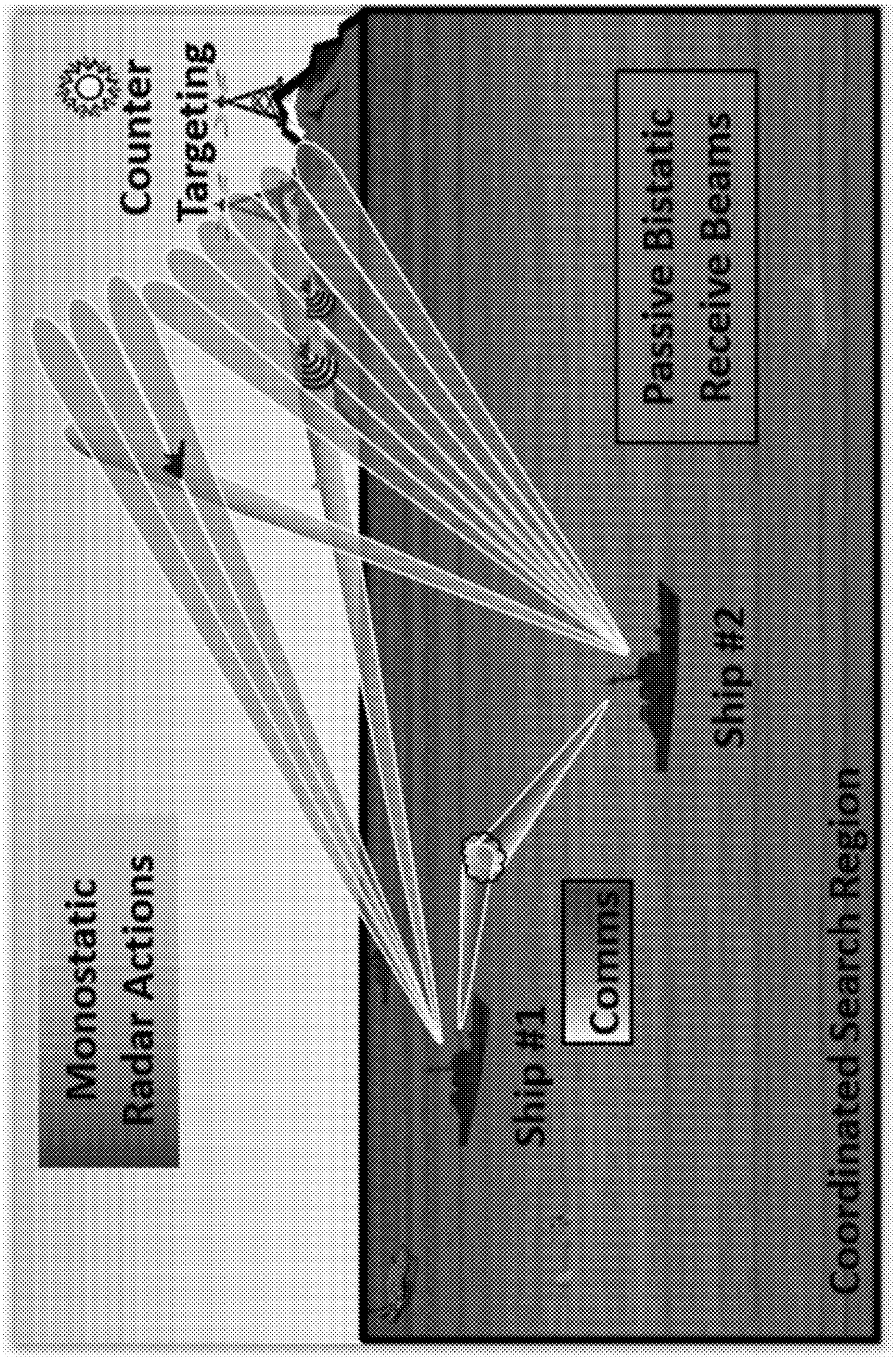
Figure 12:
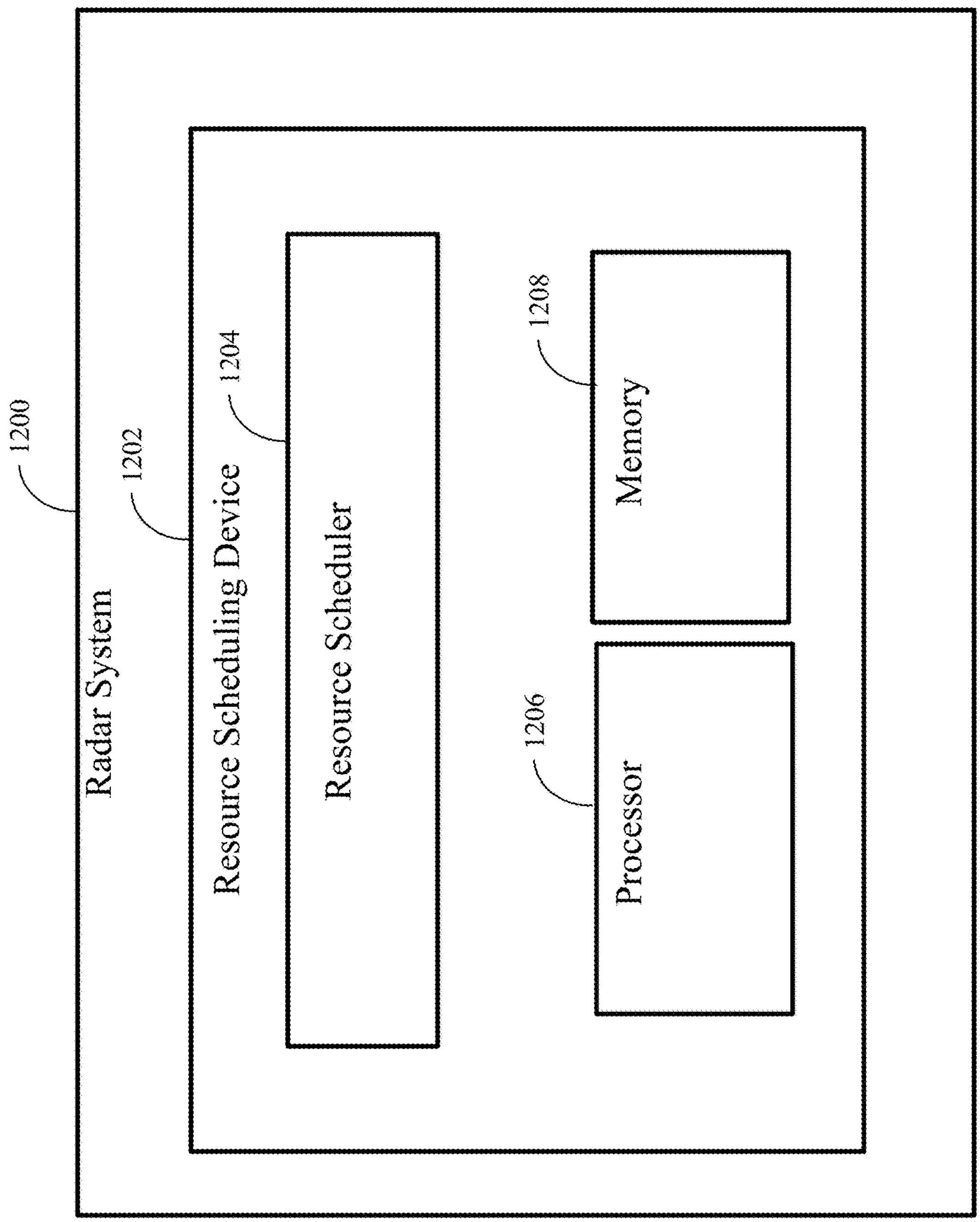
Figure 13:
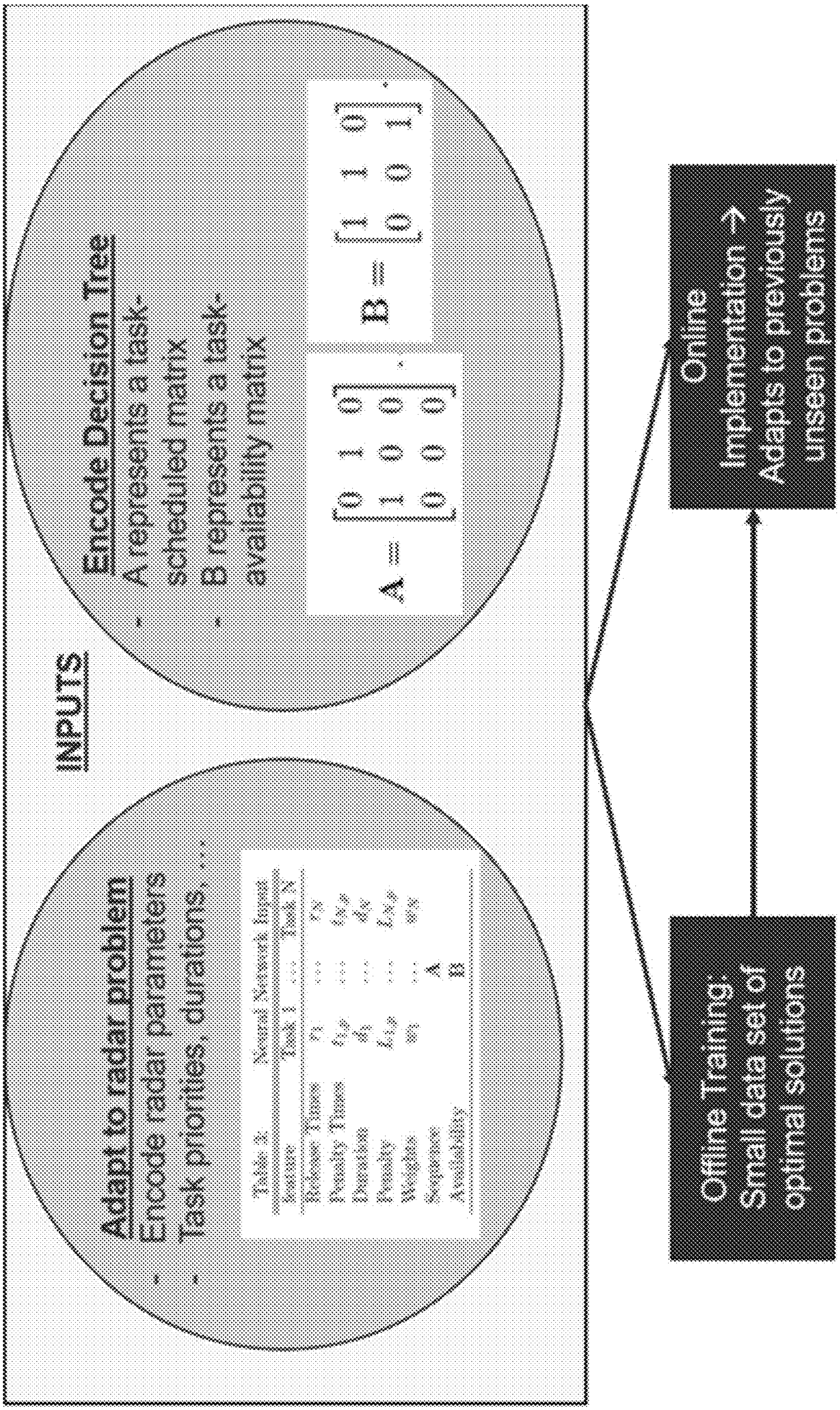

FIGS. 4, 5, and 6 are diagrams wherein the achieved revisit periods vs. task number, indicated as job id, is plotted for all tasks in accordance with an embodiment of the present disclosure;

FIG. 7 is a diagram plotting the penalty vs. computation time in accordance with an embodiment of the present disclosure;

FIG. 8 is a diagram plotting the penalty vs. computation for K=2 in accordance with an embodiment of the present disclosure;

FIG. 9 is a diagram plotting the penalty vs. computation for K=1 with no tracks present in accordance with an embodiment of the present disclosure;

FIG. 10 is a diagram showing monostatic radar actions in accordance with an embodiment of the present disclosure;

FIG. 11 is a diagram showing a distributed sensing network in accordance with an embodiment of the present disclosure;

FIG. 12 shows an exemplary diagram of a resource scheduling device in accordance with an embodiment of the present disclosure; and FIG. 13 shows a diagram illustrating how an exemplary resource scheduler in accordance with an embodiment of the present disclosure encodes radar parameters in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. OVERVIEW

Task scheduling is a critical component of modern multifunction radars. The execution time and order of radar functions, such as track updates and search dwells, can greatly affect the overall radar performance. Task scheduling is in general an NP-hard problem. An optimal solution requires computationally intensive searches, which can result in impractical delays for real-time scheduling. Heuristic solutions exist which are suboptimal, but can be implemented in real-time.

Currently, resource management for multifunction radars is generally limited to single radars. If coordination of distributed radars does occur, it requires many humans in the loop and consists of high level coordination such as radar positioning or course sectoring of radars on long time scales of several minutes to hours. Implementing changes on these time scales does not fully take advantage of the radars ability to perform operations on millisecond intervals and results in suboptimal operation.

Embodiments of the present disclosure demonstrate the implementation of a policy neural network to perform task scheduling, which offers superior performance to existing heuristic methods while maintaining feasible execution times to enable real-time implementation.

Embodiments of the present disclosure use a neural network to perform resource management. This process occurs by training the neural network offline using model problems to generate optimal schedules for a wide array of task scheduling problems. A neural network can be trained via supervised learning using labeled data (e.g., from the B&B algorithm) and then used to schedule novel tasks. An advantage of this approach is that superior performance can be achieved relative to other heuristic methods while maintaining real-time computational burdens. Embodiments of the present disclosure demonstrate the computational cost savings and performance when using a policy neural network to perform task scheduling. Embodiments of the present disclosure embed the policy neural network within a real radar surveillance and tracking scenario which requires task prioritization as well as task scheduling to meet the desired functions requirements. Additionally, embodiments of the present disclosure enable improvement in search-and-track objectives relative to heuristic methods for both the single-node and two-node cases and enable graceful degradation of function objectives relative to current heuristic solutions when the number of track tasks increases.

Assuming there are N tasks to schedule, each with the following set of parameters: a unique release time representing the availability of the task before which the task cannot be scheduled; tardiness weight representing the penalty incurred for delaying a given task; task duration; and dropping time and cost after which a task will not be scheduled and a penalty will be incurred, embodiments of the present disclosure can generate a sequence of tasks such that the combined cost of delaying and dropping tasks will be minimized. It should be noted that tasks cannot overlap in time. For example, embodiments of the present disclosure can take a sequence of input tasks and schedule them across distributed radar sensors.

Embodiments of the present disclosure demonstrate that a policy neural network scheduler has the potential of offering superior performance relative to current heuristic schedulers while still being implementable for both single radar nodes and multiple radar nodes. Embodiments of the present disclosure improve on current task scheduling alternatives by improving the produced schedule while enabling real-time implementation. Additionally, embodiments of the present disclosure enable distributed operation by sharing current task requests among the available radar sensors. Each radar will then solve the joint scheduling problem for all of the radars and then an auction will occur to determine which solution results in the best solution given the existing resources. Currently, distributed coordination only occurs on human time frames and the approach according to embodiments of the present disclosure offers faster and superior joint operation.

2. RADAR RESOURCE MANAGEMENT

As mentioned previously, a resource manager can be split into two components: (1) task parameter selection and prioritization; and (2) task scheduling. Embodiments of the present disclosure improve the performance of the task-scheduling component of the resource manager. However, to fully capture the impacts of the task scheduling on the radar's performance, the impacts of the task scheduler can be evaluated in the context of task-parameter selection and prioritization.

2.1 Task Scheduling Problem and Notation

Let the resource period (RP) represent the amount of time available to assign N tasks across K timelines. Using RPs of a fixed duration permit a straightforward means to synchronize multiple radars. The K timelines represent separate radar nodes which can be used to jointly execute a given function. The derivation that follows assumes a single timeline. In an embodiment, extension to multiple timelines requires tracking each timelines availability and will not be discussed here in greater detail.

In an embodiment, for the $n^{th}$ task, the following parameters are associated with it: release time ($r_n$), the time after which the task can be executed; task duration ($d_n$), the time it takes to execute the task; tardiness weight ($w_n$), the cost associated with delaying the execution of the task past its release time; penalty time ($t_{n,p}$), the time after which a task incurs a large penalty if it has not been executed; and the penalty ($L_{n,p}$), incurred after the current time is larger than the penalty time. Let $e_n$ represent the time when task n is scheduled to begin. Let $x_n$ represent whether a task's execution time has surpassed its penalty time, which is given by:

$$x_n = \begin{cases} 1, & \text{if } e_n \le t_{n,p} \\ 0, & \text{otherwise} \end{cases}$$

The cost associated with scheduling the $n^{th}$ task is given by $w_n(e_n - r_n)$. In an embodiment, an optimization problem to be solved can be represented as Equation (1) below:

$$e^* = \underset{e_1, e_2, \ldots, e_N}{\arg\min} \sum_{n=1}^{N} x_n w_n(e_n - r_n) + (1 - x_n)L_{n,p} \quad (1)$$

$$\text{s.t. } r_n \le e_n,\ n = 1, 2, \ldots, N$$

and no tasks overlap in time, where $e^*=[e_1^*, e_2^*, \ldots e_N^*]$ is the sequence of optimal execution times. In an embodiment, the general scheduling problem is NP-hard.

2.1. Task Parameter Selection and Prioritization

In an exemplary radar scheduler, the scheduling of dwells follows predefined priorities for each task, and attempts to schedule dwells based on those priorities and a deadline for when they are required to occur. If there is a conflict between two dwells with the same deadline, the higher priority task gets selected. This strategy can cause some tasks to miss their deadline and be delayed to the point that the task is too late to complete its function. Tracks can be lost or the search frame times become so large that new targets cannot be found in a required period of time.

Figure 1:
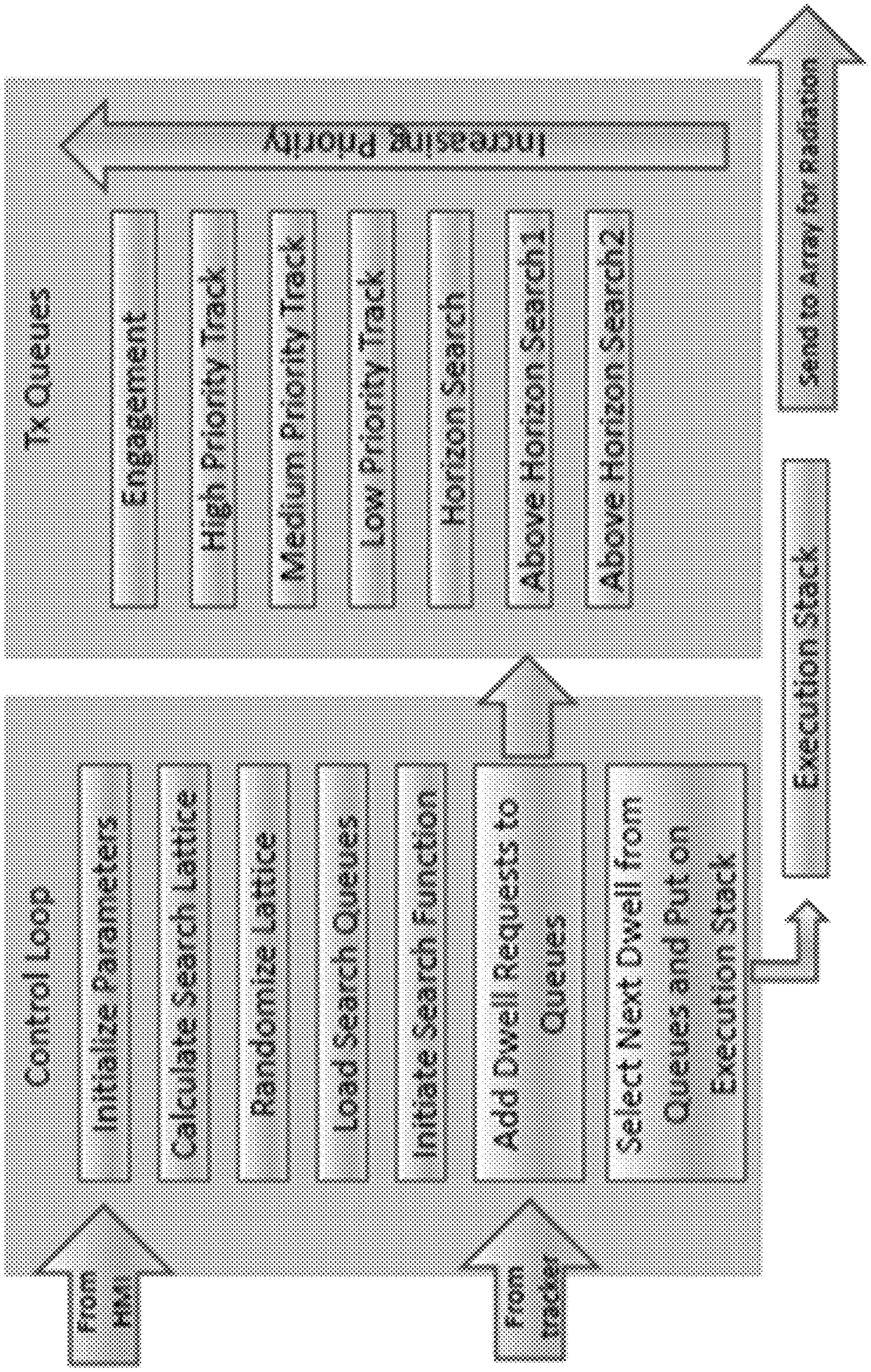
FIG. 1 shows a block diagram for an exemplary radar scheduler in accordance with an embodiment of the present disclosure.

FIG. 1 shows a block diagram for an exemplary radar scheduler in accordance with an embodiment of the present disclosure. In an embodiment, at initiation of the radar, the control loop receives the parameters with which the user intends to operate the radar through the interface to the human-machine interface (HMI). In an embodiment, the position of the beams for the search lattice are calculated, randomized for protection against jamming systems, and loaded into the search queues in the list of transmit queues. In an embodiment, the search function can be divided into multiple priorities, and usually has a horizon-search (HS) and an above horizon-search (AHS) queue. In an embodiment, the AHS queue can be further divided into priorities for the various rows of beams. In an embodiment, in these queues, the beams form a circular list whereby all beam positions are revisited before starting over to ensure that the entire volume is covered. In an embodiment, the execution stack gets loaded with a small number of search dwells, and sent to the array for radiation.

In an embodiment, typically, after operating for a while, tracks are formed, and track information is sent to the scheduler, to decide which queue the dedicated track-dwell request gets inserted on. In an embodiment, depending on the priority and updated rate, a time deadline with margin is added to the dwell request on the queue. In an embodiment, in the lower box in the control loop, decisions are made as to which dwell to place on the execution stack based on priority as discussed above. In an embodiment, these actions repeat while the radar is in the operate state.

In an embodiment, it can be assumed that a radar has multiple functions to perform. The different categories of functions can be referred to as "task type." In an embodiment, each task type requires a unique parameterization to enable the prioritization and scheduling of the tasks. In an embodiment, a large queue of tasks is constructed where each task type can be represented multiple times. Let M represent the number of tasks in the larger queue, where M≥N. Let $q_n$ represent the $n^{th}$ task in the queue. Then the tasks in the queue can be represented by $q=[q_1, q_2, \ldots, q_M]$. In an embodiment, after prioritization the tasks are sorted from highest to lowest priority. Next, in an embodiment, the N highest tasks are given to a task scheduler to arrange the tasks, such that the cost of executing those N tasks are minimized as given by Equation (1).

In an embodiment, to enable task prioritization a piecewise linear function of time, based on the task scheduling cost Equation (1), is employed to calculate each tasks priority. For the $n^{th}$ task let the task priority at time t be represented by $P_n$ where $$P_n(t) = \begin{cases} w_n(t - r_n) \text{ if } r_n \le t < t_{n,p} \\ 0 \text{ if } t < r_n \\ L_{n,p} \text{ if } t > t_{n,p} \end{cases}$$

In an embodiment, the priorities are used to sort the tasks in q to form $q_{sort}=[q_{(1)}, q_{(2)}, \ldots, q_{(M)}]$, such that $P_{q(1)} > P_{q(2)} > \ldots > P_{q(M)}$.

In an embodiment, for simplicity, two categories of functions are currently examined namely, search and track. Extension to other function types is possible. In an embodiment, the search function has been further subdivided into HS and AHS. In an embodiment, similarly, the track function is divided into three categories: high-priority track ($T_{high}$); medium priority track ($T_{med}$); and low-priority track ($T_{low}$). In an embodiment, these track categories are for dedicated track dwells which provide higher update rates than the search dwells. In an embodiment, a track-while-scan (TWS) operation can be added where all targets are tracked from measurements of the search function, with certain tracks promoted to dedicated-track status. In an embodiment, the TWS operation enables the tracking of more tracks while saving precious radar resources for tracks of higher interest, where more accurate tracks can be formed with the ability to handle targets that maneuver without the targets flying out of the predicted beam positions.

In an embodiment, the relevant parameters for search and track functions, are presented in Tables 1 and 2, respectively. In an embodiment, for this notional radar, the search function is composed of nine separate elevation sectors indicated by the row numbers in the first column in Table 1. For example, Row 1 includes 28 HS tasks with dwell durations of 36 ms, a desired revisit period of $T_R$=2.5 sec. In an embodiment, the task duration is set equal to the dwell, the penalty is set equal to $T_R$+0.1, and the task slopes are set equal to $1/T_R$ for the given task types. In an embodiment, the duplication of tasks for a given row represents the number of azimuthal beam positions to be searched for that elevation. Rows two through nine are AHS tasks. There are a total 120 search tasks. Note that these search tasks are for only one face of a phased array. In an embodiment, for a shipboard radar, three or more likely four radar faces would be used to service the entire volume about the ship. In an embodiment, a modern phased array would have the ability for each face to operate independently from the other faces. Therefore, in an embodiment, no loss in generality occurs by focusing on one face of the array, except for tracks on the boundaries of two faces. In an embodiment, that analysis would be done elsewhere.

TABLE 1

Search Parameters

| Row | Beams | Dwell (ms) | $T_R$ (s) |
|---|---|---|---|
| 1 | 28 | 36 | 2.5 |
| 2 | 29 | 36 | 5 |
| 3 | 14 | 36 | 5 |
| 4 | 9 | 18 | 5 |
| 5 | 10 | 18 | 5 |
| 6 | 9 | 18 | 5 |
| 7 | 8 | 18 | 5 |
| 8 | 7 | 18 | 5 |
| 9 | 8 | 18 | 5 |

In an embodiment, the track task parameters are summarized in Table 2. In an embodiment, for a notional radar, a track was assigned to $T_{high}$, $T_{med}$, or $T_{low}$ based on its relative position and velocity with respect to the radar. In an embodiment, the $T_{high}$, $T_{med}$, or $T_{low}$ priority tracks have update rates of 1, 2, and 4 sec respectively. The number of tracks can vary as a function of time, but to aid analysis, the number of tracks can be fixed to values of 0 and 10 in the results presented here. In an embodiment, the tracks are randomly assigned to $T_{high}$, $T_{med}$, or $T_{low}$.

TABLE 2

| Track Parameters | | | |
|---|---|---|---|
| Type | Beams | Dwell (ms) | $T_R$ (s) |
| $T_{high}$ | 1 | 18 | 1 |
| $T_{med}$ | 1 | 18 | 2 |
| $T_{low}$ | 1 | 18 | 4 |

Figure 2:
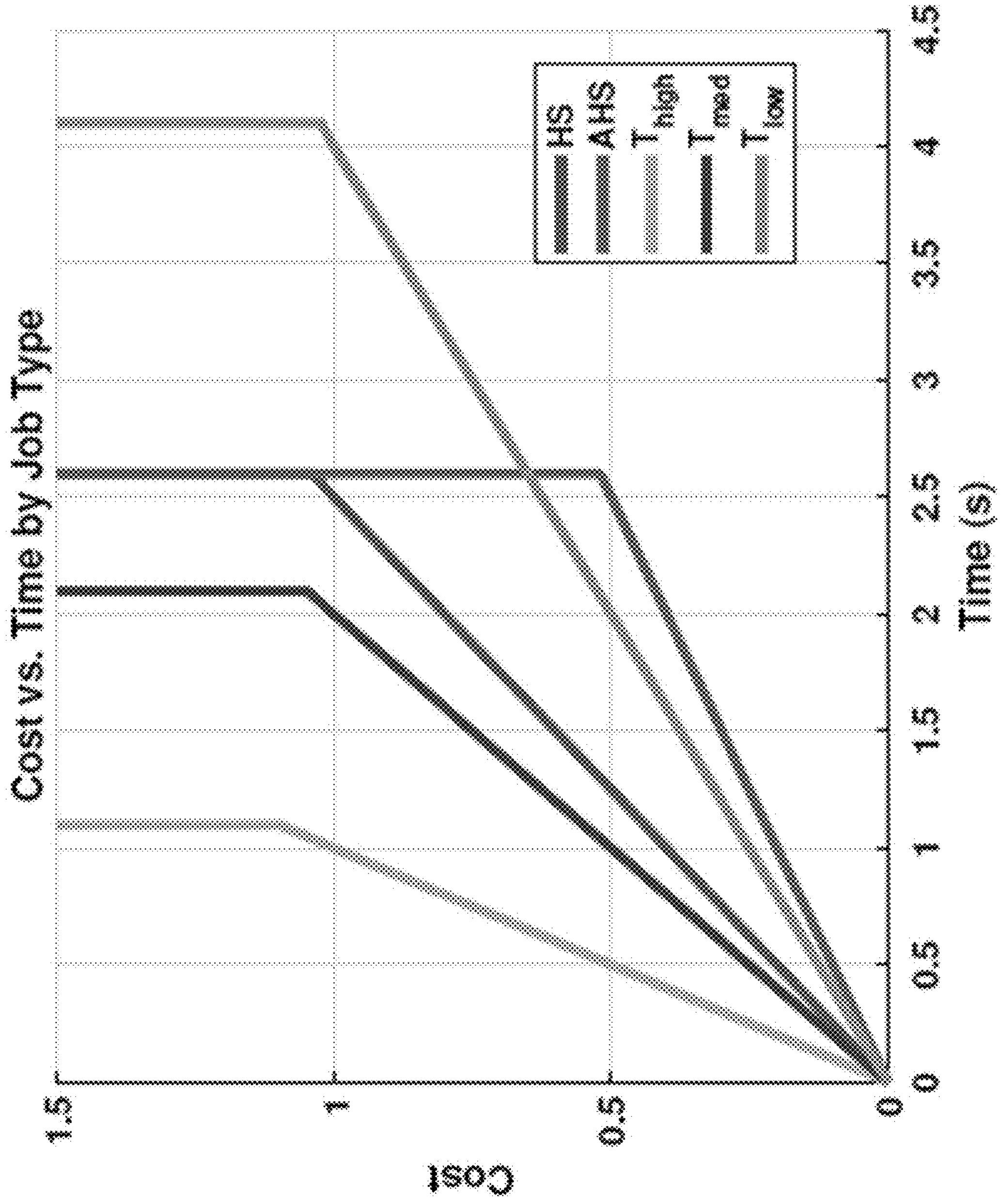
FIG. 2 shows a diagram of the cost vs. time plots for the task types described in Tables 1 and 2 in accordance with an embodiment of the present disclosure.

FIG. 2 shows a diagram of the cost vs. time plots for the task types described in Tables 1 and 2 in accordance with an embodiment of the present disclosure. In an embodiment, these curves are used for prioritization in subsequent simulations presented here. Note that the vertical axis was cut off at a cost of 1.5 to allow examination of the relative curves slopes. In an embodiment, the tasks plateau at a dropping cost of $L_{n,p}=300\ \forall n\in[1, 2, \ldots, N]$. Note that the $T_{high}$ will have the highest priority if the release times are all the same. This is followed by $T_{med}$, HS, $T_{low}$, and finally AHS. In an embodiment, these parameters and task-prioritization scheme were chosen to enable analysis of the task scheduling algorithms.

2.2 Policy Neural Network

An exemplary policy neural for task scheduling network in accordance with an embodiment of the present disclosure is described next. In an embodiment, for a fixed number of tasks, N, a policy neural network can be trained using schedules output from a B&B scheduler (e.g., optimal schedules). The trained policy neural network can be subsequently used to schedule previously unseen N task problems to a timeline.

2.2.1 Employing Trained Neural Network

In an embodiment, the next task to schedule on the timelines was chosen by examining the probabilities output from the neural network, setting the probabilities for those tasks previously scheduled to zero, re-normalizing the probabilities to sum to one, and choosing the task with the maximum renormalized probability to be scheduled next.

2.2.2 Neural Network Inputs

In an embodiment, the features input into the policy neural network are discussed next, and a representative example is given in Table 3. In an embodiment, for each task the following features were given to the neural network: $r_n$, $t_{n,p}$, $d_n$, $L_{n,p}$, and $w_n$.

In an embodiment, additionally, the prior tasks scheduled and their sequence were encoded via a one-hot encoding in a matrix denoted by A, where each row indicates the time ordering of tasks, and the column indicates which task was scheduled. For example, if N=3, and the prior sequence is [2, 1] then the sequence encoding could be given by Equation (2):

$$A=\begin{bmatrix}0&1&0\\1&0&0\\0&0&0\end{bmatrix} \tag{2}$$

TABLE 3

| (CUI) Neural Network Input | | | |
|---|---|---|---|
| feature | Task 1 | . . . | Task N |
| Release Times | $r_1$ | . . . | $r_N$ |
| Penalty Times | $t_{1,p}$ | . . . | $t_{N,p}$ |

TABLE 3-continued

| (CUI) Neural Network Input | | | |
|---|---|---|---|
| feature | Task 1 | . . . | Task N |
| Duration | $d_1$ | . . . | $d_N$ |
| Penalty | $L_{1,p}$ | . . . | $L_{N,p}$ |
| Weights | $w_1$ | . . . | $w_N$ |
| Sequence | | A | |
| Availability | | B | |

Note, in Equation (2) the last row is all zeros, indicating that the 3rd entry in the sequence has not been scheduled.

In an embodiment, a task-availability matrix, B, indicating whether a task has been previously scheduled, is appended to the input, where a one in the first row indicates that the task was previously scheduled, and a one in the second row indicates that the task is available to be scheduled. Building on the example in the prior paragraph the task availability matrix could be given by Equation (3):

$$B=\begin{bmatrix}1&1&0\\0&0&1\end{bmatrix} \tag{3}$$

2.2.3 Neural Network Architecture and Training

An exemplary summary of the policy neural-networks architecture is provided next. Many variations of the architecture were tried, and the general architecture presented resulted in greater than 85% accuracy of choosing the correct optimal action for N≤8.

In the subsequent discussion of the neural-network architecture convolutional layer (CNN), filter sizes are indicated by a two-dimensional vector where the first dimension specifies the kernel in the first dimension, and the second entry specifies the kernel in the second dimension. Additionally, in an embodiment, all CNNs employed 16 independent filters.

In an embodiment, the general architecture included a CNN with filter size [1, 4], batch normalization (BN), rectified linear unit (relu), CNN with filter size [2, 2], BN, relu, CNN with filter size [2, 2], BN, relu, CNN with filter size [2, 2], BN, relu, a dropout layer with 50% of nodes dropped, three fully connected layers of sizes 1024, 128, and N, and finally a softmax layer.

In an embodiment, the policy neural network was trained using the schedules output from a B&B algorithm for 500,000 different scheduling problems with task start times uniformly distributed between [0, 0.1] ms, durations fixed to 36 ms, task dropping times uniformly distributed between the $[r_n\ r_n+0.5]$, and uniformly distributed task tardiness weights from the set [0, 0.05, 0.1, . . . , 1]. In an embodiment, the penalties were set to $L_{n,p}=300\ \forall n\in[1, 2, \ldots, N]$. In an embodiment, the schedules output from the B&B algorithm were used to determine what the optimal action (labels) were given the current sequence state (input). This enabled supervised learning to train the policy neural network.

3. EXEMPLARY RESULTS AND IMPACTS

In an embodiment, initially the EST, ED, B&B, and neural network (NN) schedulers were compared when given the same task sets. In an embodiment, a total of 100 Monte Carlo trials were generated with N=8. In an embodiment, each Monte Carlo generated N tasks with features as described in Section 2.2.3. In an embodiment, the output sequences generated for the various algorithms were used to calculate a cumulative cost as given by Equation (1). In an embodiment, additionally, the runtime for each algorithm as calculated using Matlab 2020a running on a Microsoft Surface book with an Intel i7-6600U 2.81-GHz microprocessor, was recorded.

Figure 3:
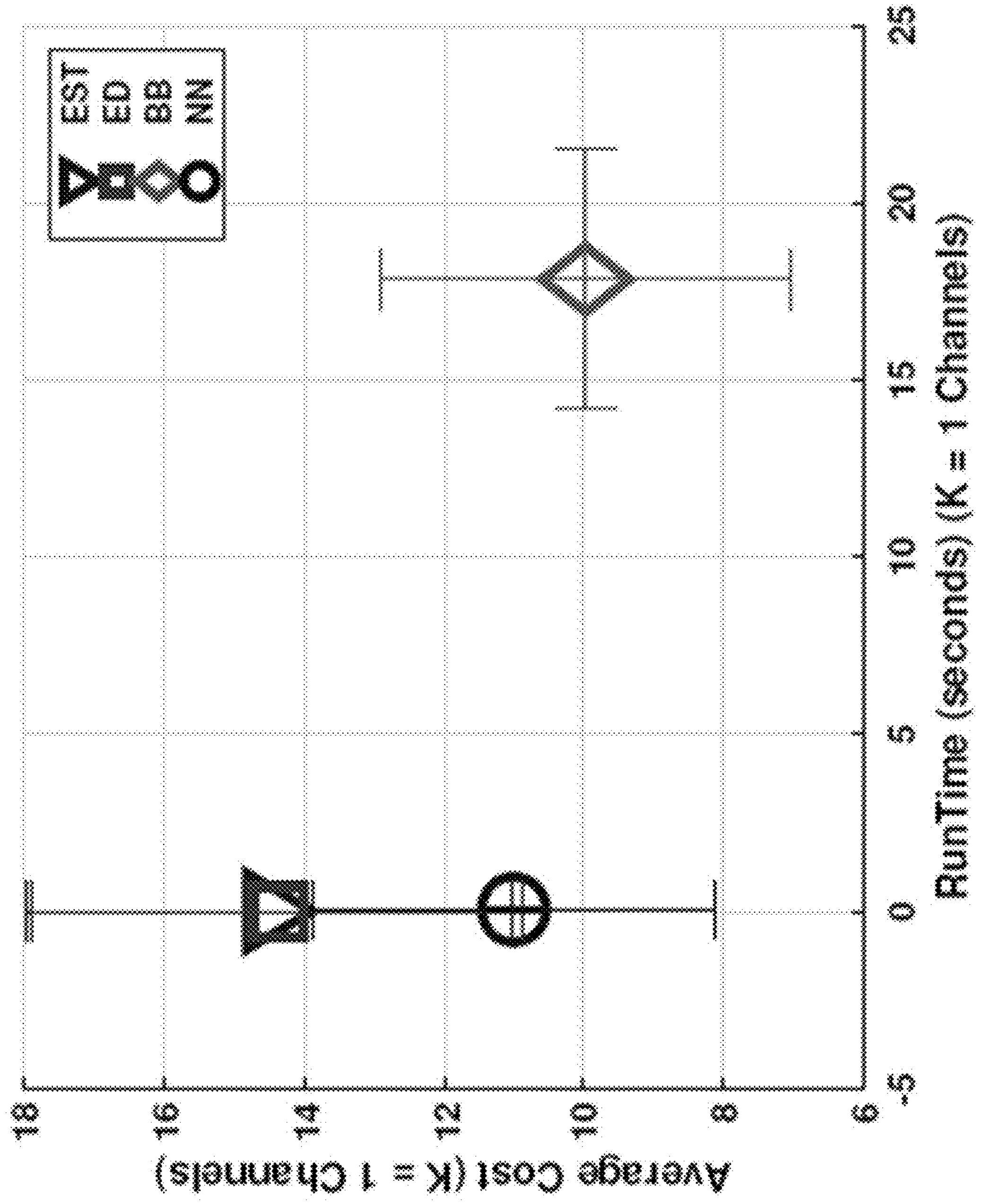
FIG. 3 shows a diagram of results of the runtime vs. algorithm cost for K=1 in accordance with an embodiment of the present disclosure.

FIG. 3 shows a diagram of results of the runtime vs. algorithm cost for K=1 in accordance with an embodiment of the present disclosure. Additionally, error bars derived from estimating one standard deviation in both the cost and computation time using the Monte Carlos are also plotted. As anticipated, the B&B algorithm has the best average cost but requires tens of seconds to reach its solution. This is not a feasible solution for radar scheduling which requires solutions within the order of tens of ms. The EST and ED have much faster solution times on the order of 0.1 ms but suffer from inferior performance. The NN solution is able to achieve a near-optimal solution at times on the order of 50 ms.

In an embodiment, next the impacts of employing the EST, B&B, and NN schedulers on the radar's ability to meet function objectives is examined. To perform this assessment, a queue of 120 search tasks and 10 track tasks for K=1 with task parameters and prioritization, as discussed in Section 2.1.1, were employed.

In an embodiment, a total of N=8 tasks with the highest priorities are taken out of the queue and given to a candidate task scheduling algorithm. After the scheduler sorts the tasks, the release times are updated, then the N tasks are placed back on the queue. The task priorities are subsequently updated, and the process repeats. The simulation RP was set to 40 ms, which given the dwell times listed in Tables 1 and 2 results in 1 or 2 tasks being scheduled every RP. Scheduled tasks with execution times greater than the current RP were not executed and were instead placed back on the queue to be processed in the next iteration. A single simulation was run for 50 seconds for each algorithm.

In an embodiment, since each task scheduling algorithm may not see the same set of tasks alternative, metrics were developed to measure the overall scheduling performance. Each time a task is scheduled, its scheduling time is recorded. This enables an average revisit period denoted as, $\hat{T}_{n,R}$ for the $n^{th}$ task, to be calculated for each task in the queue of 130 tasks. Next the average revisit periods are grouped by task type: AHS, HS, $T_{high}$, $T_{med}$, and $T_{low}$. This allows an average revisit periods for each task type to be calculated. The achieved revisit periods for each task and task type can be compared to the desired revisit periods $T_R$. Let $T_{n,R}$ indicate the desired revisit rate for the $n^{th}$ task which are generated from the values of $T_R$ listed in Tables 1 and 2.

In an embodiment, next a utility metric is calculated by taking the sum of the difference between the desired and achieved revisit periods as given by Equation (4):

$$U = \sum_{n=1}^{M} T_{n,R} - \hat{T}_{n,R}c \tag{4}$$

In an embodiment, this metric should be positive when on average the users design criteria are being met. Finally, a penalty metric was used to assess how many tasks had average revisit periods greater than the desired revisit period and was calculated using Equation (5):

$$U = \sum_{n=1}^{M} T_{n,R} - \hat{T}_{n,R} \tag{5}$$

-continued where $$1_A(x) = \begin{cases} 1, & \text{if } x \in A \\ 0, & \text{otherwise} \end{cases}$$

In an embodiment, the penalty metric will always be greater than zero and captures the sum of all tasks which have achieved revisit rates greater than the desired indicating when the radar performance is suboptimal according to the users design metrics.

FIGS. 4, 5, and 6 are diagrams wherein the achieved revisit periods vs. task number, indicated as job id, is plotted for all tasks in accordance with an embodiment of the present disclosure. Circles indicate the desired revisit periods, and diamonds indicate the achieved revisit period. Additionally, text strings are used to indicate the average achieved revisit periods by task type. Specifically, FIG. 4 shows EST performance, FIG. 5 shows BB performance, and FIG. 6 shows NN performance. The tasks indices corresponding to each task type are listed next: 1 to 28 are HS, 29 to 120 are AHS, 121 is $T_{low}$, 127 and 129 are $T_{high}$, and the remainder are $T_{med}$.

In an embodiment, comparing the RRM performance across the three scheduling algorithms reveals several trends. The EST algorithm is only able to meet the desired revisit periods for AHS and $T_{low}$ tasks. In contrast, the B&B scheduler is able to achieve the desired revisit periods for all task types except HS, where some tasks are not serviced as frequently as desired. This is reflected in the penalty and utility metrics listed in the title of FIGS. 4 and 5, where the B&B has a penalty of 0.76 vs. the EST penalty of 9.38. The NN algorithm performance depicted in FIG. 6 is comparable to the optimal scheduling B&B algorithm resulting in a penalty of 1.08 due to three AHS tasks not meeting the desired revisit period.

FIG. 7 is a diagram plotting the penalty vs. computation time in accordance with an embodiment of the present disclosure. The NN scheduler is able to offer comparable performance to the B&B scheduler while offering feasible implementation times.

FIG. 8 is a diagram plotting the penalty vs. computation for K=2 in accordance with an embodiment of the present disclosure. FIG. 9 is a diagram plotting the penalty vs. computation for K=1 with no tracks present in accordance with an embodiment of the present disclosure. Here it is shown again that the NN scheduler achieves comparable penalty to the optimal B&B scheduler while maintaining a feasible implementation time. Note that the NN actually has a better penalty metric than the B&B scheduler. This can occur because the prioritization scheme impacts the penalty and B&B finds the best sequence of N tasks not the best penalty.

4. EXEMPLARY SYSTEMS

FIG. 10 is a diagram showing monostatic radar actions in accordance with an embodiment of the present disclosure. FIG. 11 is a diagram showing a distributed sensing network in accordance with an embodiment of the present disclosure. In an embodiment, a platform, such as a ship show in FIG. 10 or FIG. 11 can include a resource scheduler in accordance with an embodiment of the present disclosure. A resource scheduler in accordance with an embodiment of the present disclosure can be implemented using software, hardware (e.g., as a resource scheduling device), and/or a combination of software and hardware. FIG. 12 shows an exemplary diagram of a resource scheduling device in accordance with an embodiment of the present disclosure. In FIG. 12, resource scheduling device 1202 includes a resource scheduler 1204, a processor 1206, and a memory 1208. In an embodiment, resource scheduling device 1202 can be implemented as a standalone resource scheduling device or can be implemented into a host device, such as on a radar system of a ship. For example, in an embodiment, resource scheduling device 1202 is implemented into radar system 1200.

In an embodiment, resource scheduler 1204 is a neural network based scheduler that uses a neural network to guide the search of a solution space by combining it with Monte Carlo rollout methods. In an embodiment, resource scheduler 1204 is trained using an optimal solution for small problems, and the solution adapts to larger problems using information learned in training. In an embodiment, resource scheduler 1204 encodes a decision tree and adapts to radar specific problems.

In an embodiment, resource scheduler 1204 takes a sequence of input tasks and schedules them across distributed radar sensors. In an embodiment, a neural network is devised to perform radar resource management and is trained offline using model problems to generate optimal schedules for a wide array of task scheduling problems. For example, assume N tasks to schedule with the following set of parameters: release time ($r_n$), the time after which the task can be executed; task duration ($d_n$), the time it takes to execute the task; tardiness weight ($w_n$), the cost associated with delaying the execution of the task past its release time; penalty time ($t_{n,p}$), the time after which a task incurs a large penalty if it has not been executed; and the penalty ($L_{n,p}$), incurred after the current time is larger than the penalty time. In an embodiment, resource scheduler 1204 generates a sequence of tasks such that the combined cost of delaying and dropping tasks will be minimized.

FIG. 13 shows a diagram illustrating how an exemplary resource scheduler in accordance with an embodiment of the present disclosure encodes radar parameters in accordance with an embodiment of the present disclosure. As illustrated by FIG. 1, at the bottom of a control loop, a radar scheduler selects a next dwell from queues and puts it in an execution stack.

In an embodiment, resource scheduler 1204 receives the N tasks to schedule with the parameters discussed above and encodes the radar parameters, task priorities, durations, etc. and encodes a decision tree. In an embodiment, a neural network is presented with problem inputs and provides decisions and provides associated probabilities of an optimal solution based on training. For example, resource scheduler 1204 can determine that a first action is 90% optimal, a second action is 5% optimal, and a third action is 5% optimal.

In an embodiment, a Monte Carlo Rollout generates a random number between 0 and 1, chooses an action based on this probability. For example, in an embodiment, values between 0.00 and 0.90 imply take action 1, values between 0.90 and 0.95 imply take action 2, and values between 0.95 and 1.00 imply take action 3.

In an embodiment, resource scheduler 1204 schedules tasks in this method, stores a solution, and repeats the process M times. In an embodiment, resource scheduler chooses a solution with the best final cost.

In an embodiment, initially, each node has its own execution stack and has a copy of its neighbors' execution stacks. In an embodiment, each node communicates the problem solutions and agrees to execute a schedule with the lowest cost. For example, in an embodiment, each radar solves the joint scheduling problem for all radars, and then an auction occurs to determine which solution results in the best solution given the existing resources.

5. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A radar system, comprising:
   a radar;
   a resource scheduling device, wherein the resource scheduling device is configured to:
      receive a plurality of tasks to schedule for the radar, wherein the plurality of tasks are associated with a plurality of parameters,
      determine respective priorities for each task in the plurality of tasks based on respective costs associated with scheduling each task,
      sort the tasks based on the determined priorities,
      generate a sequence of the tasks such that a combined cost of delaying and dropping the tasks is minimized,
      calculate respective positions of beams for a search lattice,
      randomize the positions, and
      load the positions into respective search queues; and
   a neural network configured to be trained based on generated sequences from the resource scheduling device, wherein the resource scheduling device is further configured to determine the respective priorities for each task in the plurality of tasks based on an output from the neural network.

2. The radar system of claim 1, wherein the search queues include a horizon search (HS) queue and an above horizon search (AHS) queue.

3. The radar system of claim 2, wherein the AHS queue is divided into respective priorities for respective rows of the beams.

4. The radar system of claim 1, wherein the beams form a circular list.

5. The radar system of claim 1, wherein a corresponding cost associated with scheduling an $n^{th}$ task in the plurality of tasks is given by $w_n(e_n-r_n)$, wherein $w_n$ represents tardiness weight, $e_n$ represents a time when the $n^{th}$ is scheduled to begin, and $r_n$ represents release time.

6. The radar system of claim 5, wherein the resource scheduling device is configured to:
   solve an optimization problem based on determining a sequence of optimal execution times e*; and
   determine the respective priorities based on a solution to the optimization problem.

7. The radar system of claim 6, wherein the resource scheduling device is further configured to determine the sequence of optimal execution times based on the equation:

$$e^* = \underset{e_1,e_2,\ldots,e_N}{\arg\min} \sum_{n=1}^{N} x_n w_n(e_n - r_n) + (1 - x_n)L_{n,p} \quad (1)$$

$$\text{s.t. } r_n \leq e_n,\ n = 1, 2, \ldots, N$$

and no tasks overlap in time, wherein $e^*=[e_1^*, e_2^*, \ldots e_N^*]$ represents a sequence of optimal execution times, $(t_{n,p})$ represents a penalty time, $(L_{n,p})$ represents a penalty incurred after a current time is larger than the penalty time, and $x_n$ represents whether a task's execution time has surpassed its penalty time, which is given by:

$$x_n = \begin{cases} 1, & \text{if } e_n \leq t_{n,p} \\ 0, & \text{otherwise} \end{cases}.$$

8. The radar system of claim 1, wherein the radar system is configured to execute a search function and a track function, and wherein the track function is divided into a high-priority track function $T_{high}$, a medium priority track function $T_{med}$, and a low priority track function $T_{low}$.

9. The radar system of claim 8, wherein the radar system is further configured to execute a track while scan function wherein objects are tracked from measurements of the search function.

10. The radar system of claim 8, wherein the radar system is configured to assign respective tracks to function $T_{high}$, $T_{med}$, or $T_{low}$ based on respective positions of the respective tracks with respect to the radar.

11. The radar system of claim 1, wherein the neural network is configured to generate a plurality of probabilities, and wherein the resource scheduling device is further configured to determine the respective priorities for each task in the plurality of tasks based on the probabilities.

12. A radar system, comprising:
   a radar;
   a resource scheduling device, wherein the resource scheduling device is configured to:
      receive a plurality of tasks to schedule for the radar, wherein the plurality of tasks are associated with a plurality of parameters,
      solve an optimization problem based on determining a sequence of optimal execution times e*, wherein a corresponding cost associated with scheduling an $n^{th}$ task in the plurality of tasks is given by $w_n(e_n-r_n)$, wherein $w_n$ represents tardiness weight, $e_n$ represents a time when the $n^{th}$ is scheduled to begin, and $r_n$ represents release time,
      determine respective priorities for each task in the plurality of tasks based on a solution to the optimization problem,
      sort the tasks based on the determined priorities, and
      generate a sequence of the tasks such that a combined cost of delaying and dropping the tasks is minimized; and
   a neural network configured to be trained based on generated sequences from the resource scheduling device, wherein the resource scheduling device is further configured to determine the respective priorities for each task in the plurality of tasks based on an output from the neural network.

13. The radar system of claim 12, wherein the resource scheduling device is further configured to:
   calculate respective positions of beams for a search lattice;
   randomize the positions; and
   load the positions into respective search queues.

14. The radar system of claim 13, wherein the search queues include a horizon search (HS) queue and an above horizon search (AHS) queue.

15. The radar system of claim 14, wherein the AHS queue is divided into respective priorities for respective rows of the beams.

16. The radar system of claim 13, wherein the beams form a circular list.

17. The radar system of claim 12, wherein the radar system is configured to execute a search function and a track function, and wherein the track function is divided into a high-priority track function $T_{high}$, a medium priority track function $T_{med}$, and a low priority track function $T_{low}$.

18. The radar system of claim 17, wherein the radar system is further configured to execute a track while scan function wherein objects are tracked from measurements of the search function.

19. A radar system, comprising:

a radar;

a resource scheduling device, wherein the resource scheduling device is configured to:

receive a plurality of tasks to schedule for the radar, wherein the plurality of tasks are associated with a plurality of parameters, solve an optimization problem based on determining a sequence of optimal execution times e*, wherein a corresponding cost associated with scheduling an $n^{th}$ task in the plurality of tasks is given by $w_n(e_n - r_n)$, wherein $w_n$ represents tardiness weight, $e_n$ represents a time when the $n^{th}$ is scheduled to begin, and $r_n$ represents release time, wherein the sequence of optimal execution times is based on the equation:

$$e^* = \underset{e_1, e_2, \ldots, e_N}{\arg\min} \sum_{n=1}^{N} x_n w_n (e_n - r_n) + (1 - x_n) L_{n,p} \quad (1)$$

$$\text{s.t. } r_n \leq e_n,\ n = 1, 2, \ldots, N$$

and no tasks overlap in time, wherein $e^* = [e_1^*, e_2^*, \ldots e_N^*]$ represents a sequence of optimal execution times, $(t_{n,p})$ represents a penalty time, $(L_{n,p})$ represents a penalty incurred after a current time is larger than the penalty time, and $x_n$ represents whether a task's execution time has surpassed its penalty time, which is given by:

$$x_n = \begin{cases} 1, & \text{if } e_n \leq t_{n,p} \\ 0, & \text{otherwise} \end{cases},$$

determine respective priorities for each task in the plurality of tasks based on a solution to the optimization problem, sort the tasks based on the determined priorities, and generate a sequence of the tasks such that a combined cost of delaying and dropping the tasks is minimized; and a neural network configured to be trained based on generated sequences from the resource scheduling device, wherein the resource scheduling device is further configured to determine the respective priorities for each task in the plurality of tasks based on an output from the neural network.

* * * * *